Figure 1:
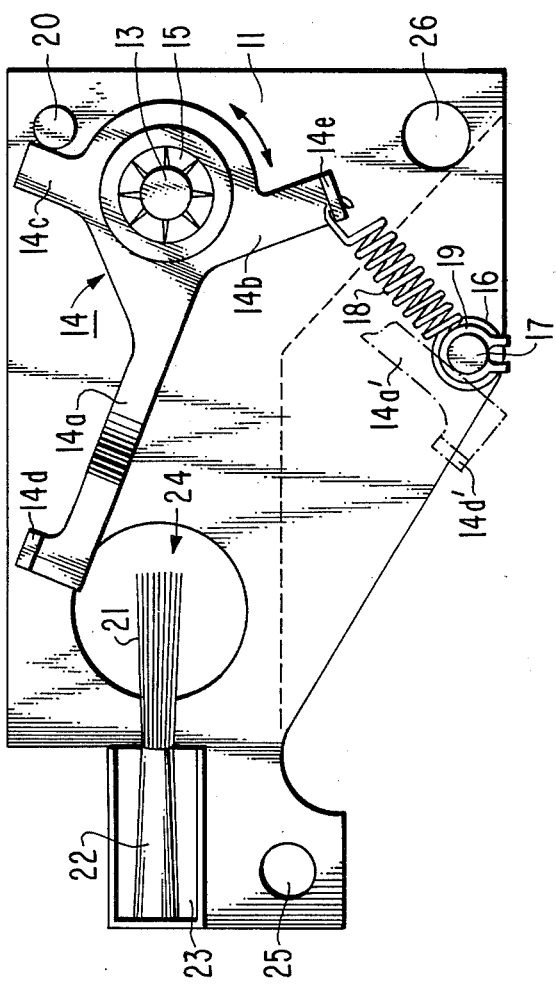

United States Patent [19]

Kirschner

[11] 4,046,384
[45] Sept. 6, 1977

[54] STYLUS CLEANING SYSTEM FOR DISC RECORD PLAYER

[75] Inventor: Thomas Francis Kirschner, Indianapolis, Ind.

[73] Assignee: RCA Corporation, New York, N.Y.

[21] Appl. No.: 667,386

[22] Filed: Mar. 16, 1976

[30] Foreign Application Priority Data

Dec. 8, 1975  United Kingdom ............... 50279/75

[51] Int. Cl.² ............................................. G11B 3/58
[52] U.S. Cl. ..................................... 274/47; 358/128
[58] Field of Search .................. 178/6.6; 274/47, 1 R, 274/23

[56] References Cited

U.S. PATENT DOCUMENTS

| | | | |
|---|---|---|---|
| 3,189,351 | 6/1965 | Hathaway | 274/23 R X |
| 3,212,784 | 10/1965 | Tatter et al. | 274/47 X |
| 3,881,734 | 5/1975 | Leedom | 274/47 X |

*Primary Examiner*—John H. Wolff
*Attorney, Agent, or Firm*—Eugene M. Whitacre; William H. Meagher

[57] ABSTRACT

A pickup arm, pivotally mounted at one end within an arm housing, supports a stylus at its free end. The housing is subject to translatory motion between a rest position, clear of a disc record supporting turntable, and playback positions over the turntable. A brush is mounted in proximity to the turntable and beneath the path of travel of the housing, with the bristles of the brush extending from a holder in directions substantially parallel to the direction of housing travel. As the housing reaches an intermediate position in passage toward the rest position, the pickup arm is depressed to cause stylus engagement with the brush bristles, which clean debris from the stylus during completion of the passage. At the rest position, the stylus is supported by the brush bristles at an elevation substantially corresponding to the stylus elevation obtained during disc record engagement in the course of playback. Additional cleaning is effected during housing passage from rest to intermediate position upon commencement of a playback sequence. Pickup arm elevation causes stylus retraction within housing during travel between intermediate and playback positions. A rotatable brush cleaning member, responsive to the translatory motion of the housing, causes agitation of the brush bristles during housing travel between playback and intermediate positions to remove debris from the brush.

9 Claims, 4 Drawing Figures

STYLUS CLEANING SYSTEM FOR DISC RECORD PLAYER

The present invention relates to a system for automatically cleaning the stylus employed in disc record player, such as a video disc record player of the type described, for example, in U.S. Pat. No. 3,842,194, issued to Jon K. Clemens.

In the Clemens player, a stylus, formed of an insulating support (which bears a conductive coating serving as an electrode), is supported at one end of a pickup arm. The arm end remote from the stylus is pivotally mounted within an arm housing, formed as an enclosure of conductive material with a bottom opening through which the stylus protrudes during disc playback. The arm housing is driven in a radial direction over the rotating disc surface during playback, enabling the stylus tip to maintain a substantially constant attitude in the succesive convolutions of the disc groove. As geometrical variations in the groove bottom, representative of the recorded information, pass beneath the stylus tip, the capacitance formed between the stylus electrode and a conductive coating (underlying a dielectric coating) on the disc surface is varied. Suitable pickup circuitry convert the capacitance variations to electrical signals which may be processed for application to a television receiver to display the recorded information.

In the course of playback operations, an accumulation of debris of various form (e.g., particles of material fragmented from stylus or disc) on the stylus tip can develop which may interfere with proper sensing of the minute groove bottom variations. To reduce adverse effects of such debris accumulation, the present invention provides a system for automatically cleaning the stylus during passage of the arm housing from a rest position (clear of the disc-supporting turntable) to its playback positions over the turntable at the onset of playback of a disc, and during its return passage to the rest position at the cessation of disc playback.

The cleaning system employs a brush (e.g., of nylon bristles) fixed in a position (to one side of the turntable) over which the housing travels during its passages to and from the rest position. Advantage is taken of an automatic arm lowering-during-rest feature described in a copending U.S. patent application, Ser. No. 667,309 of John C. Bleazey and Marvin A. Leedom entitled "STYLUS ARM LIFTING/LOWERING APPARATUS FOR A VIDEO DISC PLAYER," to achieve a brushing of the stylus by the brush bristles during housing travel in the vicinity of the rest position.

In the Bleazey, et al. arrangement, an electrically actuated arrangement effects lowering of the pickup arm to permit stylus reception in a disc groove during disc playback. During housing travel to and from a selected playback set-down position, however, the electrical actuation is removed so as to provide an elevated position for the pickup arm, retracting the stylus within the housing (so as to clear, for example, the disc record's outer bead). The Bleazey, et al. arrangement, however, seeks to avoid maintenance of the elevated arm position during rest (in order that a compliant support element for the arm may not develop a "set" that would subsequently interfere with proper arm motion achievement). To this end, an additional mechanical actuation of an arm lowering action is effected as the housing approaches its rest position so that the arm may assume its normal "play" position during rest.

In accordance with the present invention, the brush location is chosen so that the aforesaid mechanically-acutated arm lowering results in the protruding stylus engaging the bristles of the brush as the rest position is approached, with the brush providing support for the stylus end of the released stylus arm in the final rest position. The brush elevation is chosen so that the bristles support the stylus at an elevation substantially corresponding to that of the disc surface to ensure that the arm's rest position substantially corresponds to its normal play position.

Figure 2:
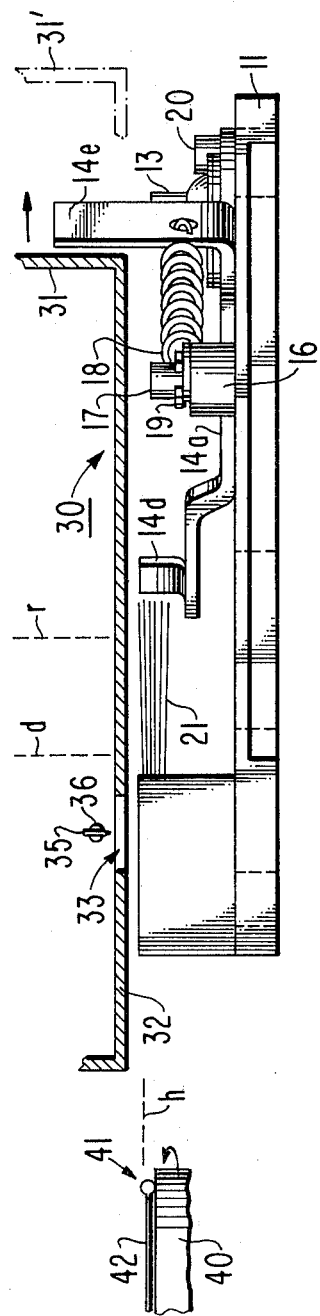
Figure 3:
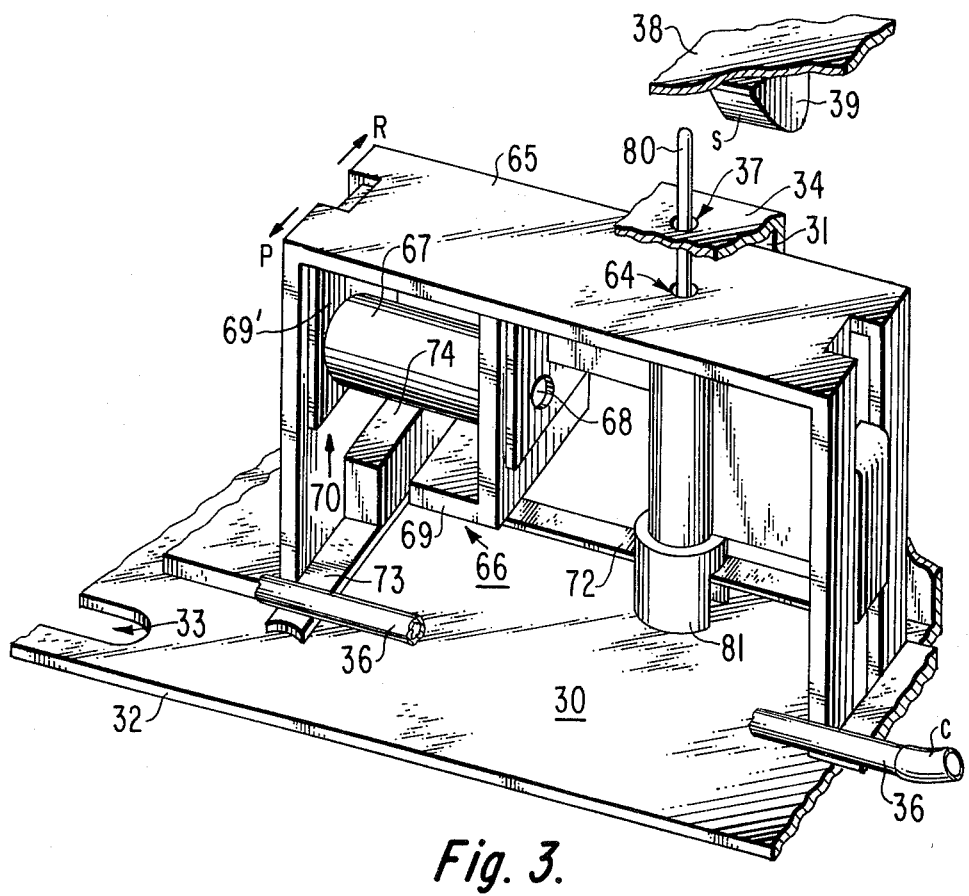
Figure 4:
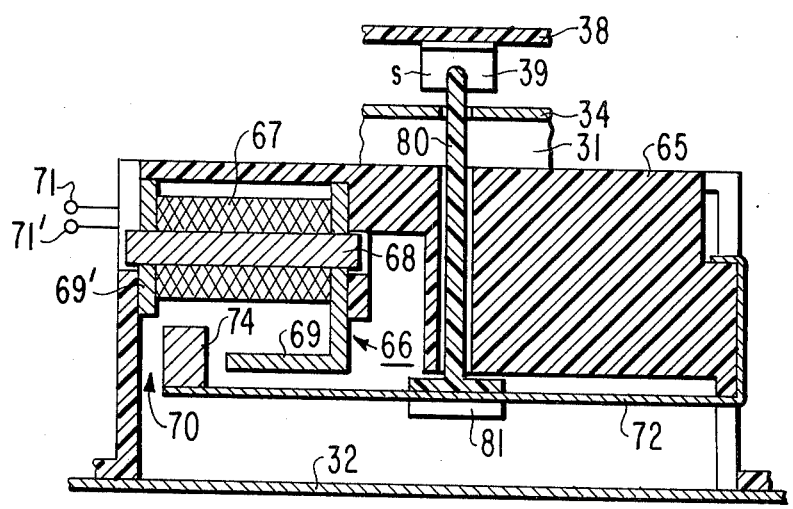

In accordance with a further aspect of the present invention, a brush cleaning mechanism is provided which responds to the housing travel to and from the rest position by agitating the brush to remove deposited debris therefrom. In the accompanying drawings:

FIG. 1 provides a plan view of stylus cleaning apparatus in accordance with an embodiment of the present invention;

FIG. 2 provides a side view of the apparatus of FIG. 1 in association with cooperating apparatus of a video disc player;

FIG. 3 provides a perspective view of stylus lowering apparatus, suitable for use with the apparatus of FIG. 1 in practice of the present invention; and FIG. 4 provides a cross-sectional view of the apparatus of FIG. 3.

FIG. 1 provides a plan view of a stylus cleaning assembly for use in a video disc player in accordance with an embodiment of the present invention. The assembly comprises a base 11 from which upwardly projects a post 13. A member 14, rotatably mounted on post 13 beneath a lock washer 15, is provided with a trio of projecting arms 14a, 14a and 14c. The end of arm 14b remote from post 13 terminates in an upward projection 14e. One end of a coiled spring 18 is hooked through an aperture near the lower extremity of projection 14e, while the opposite end of spring 18 rests upon a cylindrical projection 16 of base 11, and encircles a second post 17 beneath a retaining ring 19.

The spring 18 urges member 14 into a rotational position causing arm 14c to engage the side of a third post 20 projecting upwardly from base 11 (such rotational position being shown in solid lines in FIG. 1). Arm 14a is provided with an upwardly turned projection 14d at its end remote from post 13. When arm 14c engages post 20, the projection 14d of arm 14a is located in the vicinity of, but to one side of, the free ends of a plurality of substantially straight bristles, secured at their opposite ends in a holder 22, the bristles forming a brush 21. The holder 22 is secured in a compartment 23 elevated above base 11. A well 24 is formed in base 11 beneath brush 21. Additional holes 25, 26 are provided in base 11 for reception of bolts (not shown) to secure the cleaner assembly in an appropriate location at one side of the player's turntable.

As shown in the assembly side view of FIG. 2, a desired location of the cleaner assembly in the player places the upper extremity of projection 14e in the path of travel of the player's arm housing 30 from the vicinity of turntable 40 to its rest position. A portion of the housing enclosure is shown in section in FIG. 2, including the housing bottom 32 and a portion of outer wall 31, at a point (in the housing travel to a rest position) just prior to engagement of projection 14e by housing wall 31. When such engagement does take place, movement of wall 31 (in the direction shown by the arrow in FIG. 2) causes a counter-clockwise rotation of member 14 from the position shown in solid lines in FIG. 1. As such counter-clockwise rotation progresses (stretching spring 18), projection 14d passes through the location of brush 21, agitating the bristles to dislodge debris therefrom into well 24. The rotation continues until housing 30 reaches its rest position, indicated in FIG. 2 by a dashed-line showing of an outer wall location (31'). A limit to counterclockwise rotation of member 14 is established by engagement of arm 14a with the side of post 17. This limit position is indicated in FIG. 1 by a dash-dot line showing of an arm location (14a', 14d'').

For the housing location shown in solid lines in FIG. 2, the stylus 35 appears retracted within housing 30 (above bottom opening 33) due to an elevated position for its support arm 36. At a subsequent point in the passage of housing 30 to its rest position, after projection 14d has passed through the brush 21, the mechanically actuated lowering of arm 36 is effected (as, for example, in the manner described in the aforesaid Bleazey, et al. application), allowing stylus 35 to drop through opening 33 into engagement with the bristles of brush 21. Dashed line d is illustrative of the stylus location when such engagement is initiated. As housing travel continues, the stylus 35 passes along the length of the brush bristles until reaching its rest position (illustratively, in alignment with dashed line r). During housing rest, the stylus end of arm 36 is supported by brush 21. The brush elevation is chosen so that stylus 35 is supported at an elevation substantially matching that of the grooved surface 42 of a turntable-supported disc record 41 (such surface elevation being represented in FIG. 2 by dashed line h).

When a playback cycle is commenced, the cleaning process described above again occurs in a reversed sequence. Stylus 35 travels along the length of the brush bristles from location r to location d as housing 30 moves away from its rest position. An elevation reoccurs when location d is passed. As wall 31 moves away from its rest location (31'), spring 18 rotates member 14 in a clockwise direction. Subsequent to the re-elevation of arm 36, projection 14d passes through brush 21 again in returning to the position shown in solid lines in FIG. 1.

FIGS. 3 and 4, in respective perspective and cross-sectional view, illustrate stylus lifting/lowering apparatus, of the form described in the aforesaid Bleazey, et al. application, which may be used herein to effect the previously described: (1) lowering of stylus 35 during stylus travel between positions d and r, (2) the elevation of stylus 35 during stylus travel between position d and a playback position, and (3) the lowering of stylus for record engagement, when in a playback position.

As shown in FIGS. 3 and 4, a support member 65, illustratively formed of a plastic material, is mounted in the arm housing 30, secured (by suitable means, not shown) to the bottom 32 of the housing. The support member 65 serves as a mount for an electromagnet 66, formed by a core 68 of magnetizable material, surrounded by a winding 67, and in communication with a pair of pole pieces 69, 69' of magnetizable material, spaced to define an air gap 70. The respective ends of winding 67 are linked to energization terminals 71, 71'.

A leaf spring 72, anchored at one end to the support member 65, supports at its free end a permanent magnet 74 and an arm rest 73. The notched base 81 of a plunger 80 rests upon the leaf spring 72 at an intermediate point of its length, with an intermediate portion of the spring 72 nested in the notch of the base 81. The plunger 80 fits loosely in a shaft which extends upwardly within support member 65 to an opening 64 at the top of support member 65. The plunger 80 extends through opening 64 and a registered opening 37 in the top wall 34 of the housing 30.

The disposition of leaf spring 72, and the magnet 74 and arm rest 73 carried thereby, as it is shown in FIGS. 3 and 4, corresponds to that which is maintained in the absence of energization of the electromagnet 66, and in the absence of displacement of plunger 80 by external forces. In this depicted disposition, the arm rest 73 supports the stylus arm 36 in an elevated position, precluding the protrusion of stylus 35 through the aperture 33 in the housing bottom 32. Such an elevation of the stylus is desired during housing travel between playback positions and an intermediate position between the playback positions and the rest position.

When the housing 30 is in a desired playback position over the turntable 40, an energizing potential of appropriate magnitude and polarity is selectively applied across the winding energization terminals 71, 71' to develop a field across gap 70 which causes repulsion of the permanent magnet 74 in a downward direction. As spring 72 flexes downwardly to accommodate such repulsion, arm rest 73, and the stylus arm 36 resting thereon, are lowered to permit protrusion of stylus 35 through aperture 33 to a degree of permitting stylus contact with the disc record surface 42. Desirably, the energizing potential reaches a magnitude greater than that required to initiate stylus-record contact, so that arm 36 is freed from contact with arm rest 73 during playback.

At the cessation of a playback period, electro-magnet 66 is deenergized, and spring 72 returns arm rest 73 to the elevated position depicted in FIGS. 3 and 4. This position is maintained during the initial portion of the passage of housing 30 to its rest position, including the period initially following contact between the housing side wall 31 and cleaner arm projection 14e (FIG. 2) when arm projection 14d passes through the brush bristles 21. However, when the stylus 35 reaches position d (FIG. 2), a relowering of arm 36 is effected by a displacement of plunger 80.

As shown in FIG. 3, travel of the housing 30 toward its rest position (i.e., in the direction R) carries the housing 30 beneath a rigid cover 38. Depending from the cover 38, in the path of travel of the protruding top of plunger 80, is a cam member 39, presenting a surface s to the approaching plunger top. As housing travel brings the top of the plunger 80 into engagement with surface s, the plunger 80 is forced downward. Spring 72 flexes downward to accommodate the motion of plunger 80, depressing arm rest 73 sufficiently so that stylus 35 extends through aperture 33 into engagement with the bristles 21. The stylus tip surfaces are brushed by the engaging bristles as the stylus travels between positions d and r. During this period of travel, the arm rest 73 is sufficiently depressed as to be free of contact with arm 36 now supported by stylus contact with bristles 21. The support by bristles 21 is such that, during occupancy of the rest position by the housing 30, the elevation of stylus 35 substantially corresponds to its elevation during record surface contact. With such an elevation, the compliant coupler C at the rear end of arm 36 is in a substantially unstressed condition (in contrast with its stressed condition during arm elevation as shown in FIG. 3).

When a new playback sequence commences, the lowered stylus 35 passes along the bristles 21 until stylus position d is reached, and plunger 80 is released from its depressed condition by its removal from engagement with surface s of cam member 39 as housing 30 travels in the direction P (FIG. 3). Spring 72 thereupon returns arm rest 73 to the elevated position shown in FIGS. 3 and 4, to hold stylus 35 in a retracted location during its travel from position d to a playback position.

What is claimed is:

1. In a disc record player including a turntable for rotatably supporting a disc record during playback; and a pickup stylus subject to engagement with a record surface during said playback, said stylus being mounted at one end of a pickup arm, the opposite end of said pickup arm being pivotally mounted in a housing which is subject to translatory motion between a rest position clear of said turntable and playback positions over said turntable; apparatus comprising the combination of:
   a brush comprising a holder, and a plurality of bristles secured in said holder;
   means for fixedly supporting said holder in a location in proximity to said turntable and beneath the path of travel of said housing between said rest and playback positions; and
   means for controlling the rotation of said stylus arm about an axis substantially parallel to the disc supporting surface of said turntable in a manner causing said stylus to protrude from said housing to a degree sufficient to engage said bristles and to be supported thereby, during occupancy of said rest position by said housing, and during travel of said housing between said rest position and an intermediate position between said rest position and said playback positions;
   the elevation of said holder in its supported location being so related to the elevation of said disc supporting turntable surface that said stylus is supported by said bristles, during housing occupancy of said rest position, at an elevation substantially corresponding to the elevation of said stylus obtained during said record surface engagement.

2. Apparatus in accordance with claim 1 also including means, subject to movement in response to the translatory motion of said housing during a segment of said housing travel, for cleaning said brush during the occurrence of each passage of said housing between said rest and playback positions.

3. Apparatus in accordance with claim 1 wherein said bristles extend from said fixedly supported holder in respective directions substantially parallel to a direction of travel of said housing.

4. In a disc record player including a turntable for rotatably supporting a disc record during playback; and a pick up stylus subject to engagement with a record surface during said playback, said stylus being supported at one end of a pickup arm, the opposite end of said pickup arm being pivotally mounted in a housing which is subject to translatory motion between a rest position clear of said turntable and playback positions over said turntable; apparatus comprising the combination of:
   a brush comprising a holder, and a plurality of bristles secured in said holder;
   means for supporting said holder in a location in proximity to said turntable and beneath the path of travel of said housing between said rest and playback positions;
   means for controlling the rotation of said stylus arm about an axis substantially parallel to the disc supporting surface of said turntable in a manner causing said stylus to protrude from said housing to a degree sufficient to engage said bristles, during occupancy of said rest position by said housing, and during travel of said housing between said rest position and an intermediate position between said rest position and said playback positions;
   the elevation of said holder in its supported location being so related to the elevation of said disc supporting turntable surface that said stylus is supported by said bristles, during housing occupancy of said rest position, at an elevation substantially corresponding to the elevation of said stylus obtained during said record surface engagement; and
   means responsive to the translatory motion of said housing for cleaning said brush during the occurrence of each passage of said housing between said rest and playback positions;
   wherein said brush cleaning means includes a rotatable member having a first arm and a second arm; a segment of said first arm being disposed in said path of travel of said housing in such manner that passage of said housing from a playback position to said rest position causes engagement to said segment by said housing and rotation of said member in a first direction, said rotation of said member in said first direction causing agitation of said bristles by a portion of said second arm moving from a first position at one side of said holder to a second position at an opposite side of said holder.

5. Apparatus in accordance with claim 4 wherein said brush cleaning means also includes spring means for urging rotation of said member in a second direction opposite to said first direction, said spring means causing agitation of said bristles by movement of said portion of said second arm from said second position to said first position during a passage of said housing from said rest position to a playback position.

6. Apparatus in accordance with claim 5 wherein the orientation of said second arm relative to said first arm is such that said bristle agitation occurs during movement of said housing between said intermediate and said playback positions.

7. Apparatus in accordance with claim 6 wherein said arm rotation controlling means causes retraction of said stylus within said housing during travel of said housing between said intermediate and playback positions.

8. In a disc record player including a turntable for rotatably supporting a disc record during playback; and a pickup stylus subject to engagement with a record surface during said playback, said stylus being mounted at one end of a pickup arm, the opposite end of said pickup arm being pivotally mounted in a housing which is subject to translatory motion between a rest position clear of said turntable and playback positions over said turntable; apparatus comprising the combination of:
   an arm rest subject to movement between an elevated position and a depressed position;
   spring means coupled to said arm rest for biasing said arm support toward said elevated position;
   selectively energized electromagnetic means for effecting a lowering of said arm rest from said elevated position to said depressed position upon appropriate energization thereof, said elevated position being such that said arm rest is in supporting engagement with said pickup arm at an elevation providing a retracted location for said stylus precluding record surface engagement thereby, and said depressed position being such that said energization of said lower means during housing occupancy of a playback position effects protrusion of said stylus from said housing to a degree permitting engagement of the surface of a turntable supported disc record thereby with accompanying disengagement of said pickup arm from said arm rest;

means, independent of said selectively energized means for causing said arm rest to occupy said depressed position during travel of said housing between said rest position and a position intermediate said rest position and said playback positions;

a brush comprising a holder, and a plurality of bristles secured in said holder; and means for supporting said holder in a location clear of said turntable and beneath the path of said housing, said location positioning said bristles for intersection with said stylus during a depression of said arm rest caused by said independent means, under conditions of (1) disengagement of said pickup arm from said arm rest and (2) protrusion of said stylus from said housing to a degree substantially matching the degree of protrusion associated with stylus engagement of the surface of a turntable supported disc record.

9. Apparatus in accordance with claim 8 wherein said bristles of said brush support said protruding stylus, during housing occupancy of said rest position, at an elevation substantially corresponding to the elevation of said stylus obtained during said record surface engagement.

* * * * *